July 27, 1965   L. A. LUKER   3,196,777
BAKE PAN

Filed Feb. 6, 1962   3 Sheets-Sheet 1

INVENTOR.
LOUIS A. LUKER
BY
Warren Kinney Jr.
ATTORNEY

July 27, 1965   L. A. LUKER   3,196,777
BAKE PAN
Filed Feb. 6, 1962   3 Sheets-Sheet 2
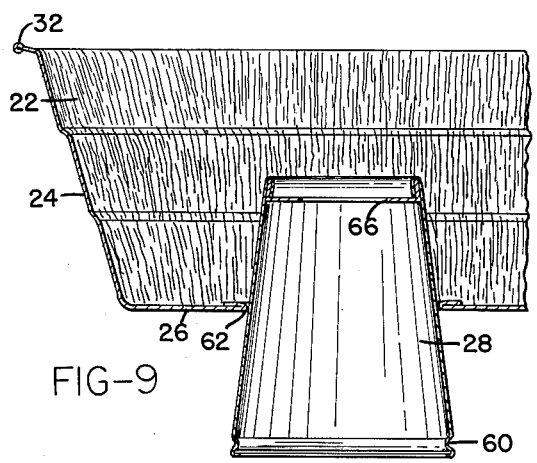
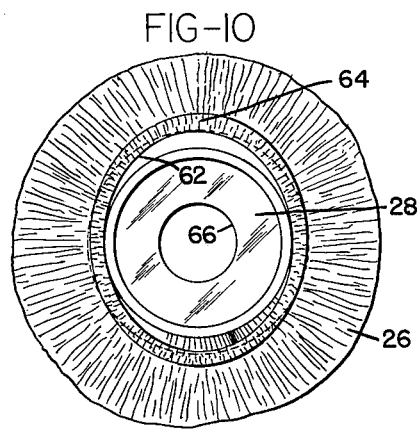
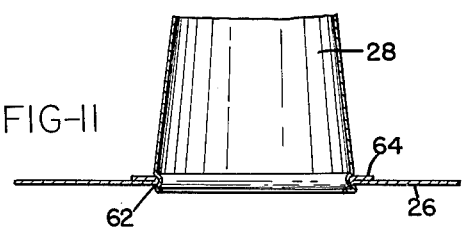
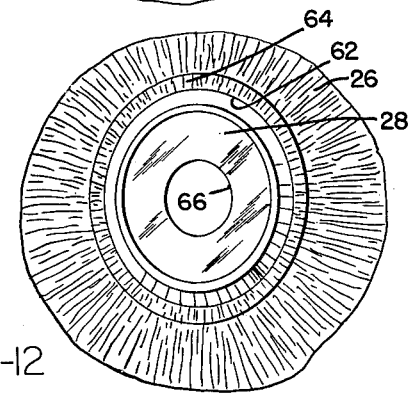
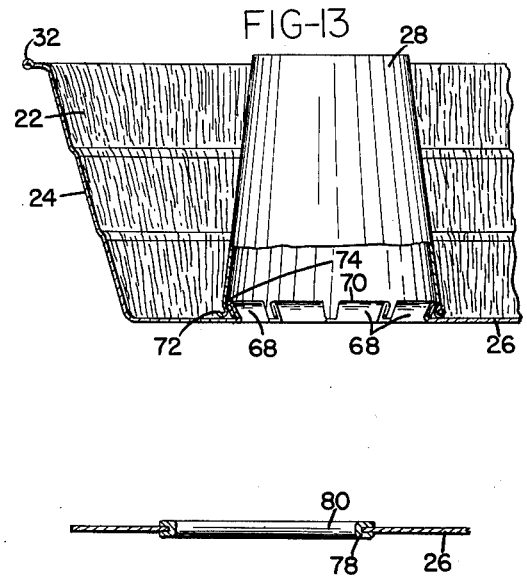
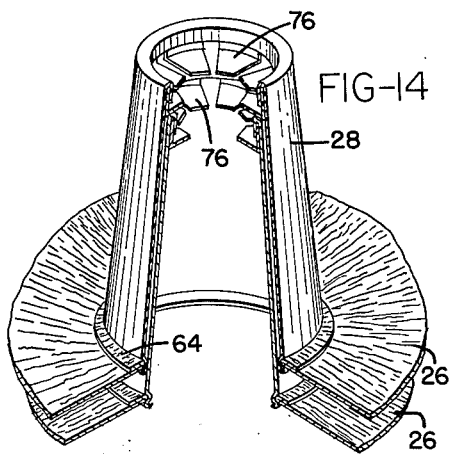
INVENTOR.
LOUIS A. LUKER
BY
ATTORNEY July 27, 1965 L. A. LUKER 3,196,777
BAKE PAN
Filed Feb. 6, 1962 3 Sheets-Sheet 3

INVENTOR.
LOUIS A. LUKER
BY
J. Warren Kinney Jr.
ATTORNEY

United States Patent Office 3,196,777
Patented July 27, 1965

3,196,777
BAKE PAN
Louis A. Luker, Mount Vernon, Iowa, assignor to Jackson M. Luker, Urbana, Ill.
Filed Feb. 6, 1962, Ser. No. 171,454
4 Claims. (Cl. 99—439)

The present invention relates to an inexpensive, disposable cake pan, and is concerned particularly with a cake pan of the type having a central upright heat tube surrounded by a deep circumferential wall, such pans being generally used in the baking of angel food cakes. Pans of this type have been quite expensive when formed of sheet metal, due to the deep draw procedure required in the manufacture thereof, and in some instances the necessity for separately forming and attaching the upright heat tube to the pan section.

In commercial practice, the aforesaid type of cake pan was fabricated from rather heavy gauge metal in order to withstand the abuses of transport and repeated re-use, and damage or loss of such pans represented a sizable expense to the owner. In some instances, the pans accompanied the cakes baked therein during shipment to the retailer or possibly to the ultimate consumer, who was required to place a money deposit on the pans to encourage return of the pans to the bakery. This arrangement of necessity was troublesome and inconvenient for all persons concerned, and involved considerable handling and shipping expenses, along with the risk of damage and possible loss of the pans.

One of the objects of the present invention is to eliminate the need for expensive pans in the baking and shipment of angel food type cakes, and to dispense with the aforementioned return shipment of pans to the bakery, these objectives being attained by providing pans which are so inexpensively produced as to be used once and then disposed of.

Another object is to provide an inexpensive disposable pan of the heat tube type, in which the cake may be baked, shipped, and delivered to the ultimate consumer, such pan serving as the shipping container, or as a major element of the shipping package, from the time it leaves the bake oven until it is lodged in the hands of the ultimate consumer.

Another object is to provide a cake pan of the type having a central heat tube, which may be furnished and delivered to the bakery in a knocked-down highly compact condition for convenient assembly by the baker just prior to being filled with cake batter.

A further object is to provide such a pan as above described, which has all the desirable qualities of the conventional metallic pan for achieving baking excellence, while at the same time greatly minimizing initial cost and eliminating the previous expenses and inconveniences of return handling, shipment, washing, and storage for subsequent use.

Another object of the invention is to produce a highly satisfactory cake pan of the character stated, which is easily and simply manufactured from metallic foil, with a common form of paper cup utilized as the heat tube, the entire assembly being so inexpensive as to effect great savings to the baker by reason of the consumer's disposition thereof after a single use.

Another object is to provide in an angel food cake baking pan, a novel form of heat tube construction which is simple, inexpensive, and effective for the proper baking of angel food and similar cake batters.

The foregoing and other objects are attained by the means described herein and illustrated upon the accompanying drawings, in which:

FIG. 9 is a cross-sectional view of a second modification, showing the heat tube in the process of attachment to the pan body.

FIG. 10 is a fragmental top plan view of FIG. 9.

FIG. 11 is a fragmental cross-section showing the heat tube of FIG. 9 advanced to home position upon the pan body.

FIG. 12 is a fragmental top plan view of FIG. 11.

FIG. 13 is a vertical cross-section of a third modification.

FIG. 14 is a perspective view partly in cross-section, sohwing how the pans may be nested and stacked if desired.

FIG. 15 is an enlarged fragmental cross-section of a pan bottom having a reinforcement means for support of a heat tube.

Figure 1:
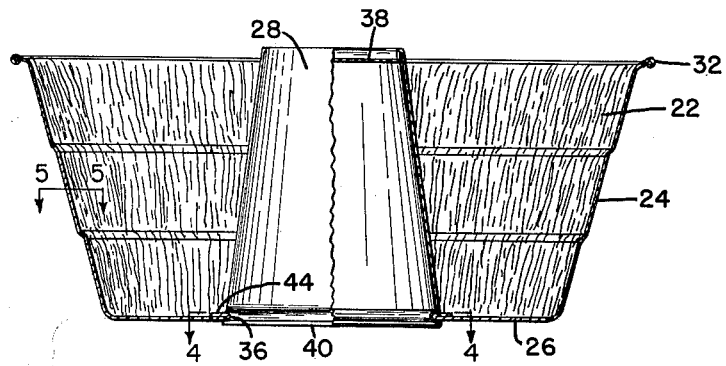
FIG. 1 is a vertical cross-section of one form of cake pan embodying the present invention, parts being shown in elevation.

With reference to the drawing, FIG. 1, the character 22 indicates a circular cake pan body shaped and formed by means of suitable dies, from an initially flat sheet of metallic foil. Aluminum foil of .002 to .005 inch thickness is considered adequate for the pan body, although foils of other metals and of other thicknesses may be employed when appropriate.

As is readily understood, subjecting the flat sheet to a die set for forming the deep circular pan body will of necessity result in the formation of surface wrinkles 30 as indicated upon the several drawing views. These wrinkles lend a degree of rigidity to the pan wall and tend to preserve the formed shape of the pan.

In all the drawing views, 22 indicates a pan, 24 its upright side wall, 26 its bottom wall, and 28 the central heat tube upstanding upon or relative to the pan bottom wall. In the preferred construction, the pans have a reinforced circumferential upper rim 32, produced by rolling or turning the foil stock upon itself.

In the FIG. 1 form of pan, the bottom 26 is provided with a circular central opening 36 adapted to accommodate the lip portion of an inverted paper drinking cup 28 which serves as the heat tube for the pan. Such paper cups are common articles of commerce, and are readily available. The cup shown is tapered inwardly and upwardly, or from a larger diameter at the lip to a smaller diameter at the cup bottom 38.

Figure 2:
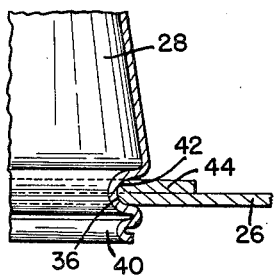
FIG. 2 is an enlarged fragmental cross-section of the connection between the pan and the heat tube of FIG. 1.
Figure 3:
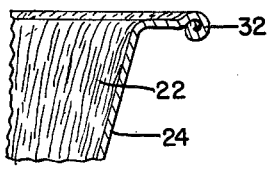
FIG. 3 is a fragmental enlarged cross-section of the pan rim.

One form of paper cup readily available has at its open end a circumferential turned or finished edge 40 in the form of a bead as shown in FIG. 2, and alongside the bead is a circumferential outwardly exposed deep channel 42. The base of channel 42 furnishes an annular seat accommodating the edge of opening 36 in the pan bottom, thereby providing a connection which assures attachment of the cup to the pan bottom, with the cup upstanding thereon in inverted condition. The inner edge of opening 36 may be reinforced in any appropriate manner, as by turning the material of the pan bottom upon itself, at 44, to provide a multiple thickness of material.

To assemble the cup and pan, it is necessary only to insert the paper cup upwardly through the pan bottom opening 36, and to advance the cup whereby the tapered wall of the cup adjacent to channel 42 will gradually distend the reinforced opening of the pan bottom until the channel registers with the reinforced opening and, with a snap action, the edge of the opening falls into channel 42. The foil of the pan bottom is sufficiently resilient to yield to the distending force imposed by the tapered wall of the cup, until finally the reinforced edge surrounding the pan bottom opening snaps into the channel.

By referring to FIGS. 1 and 2, it will be seen that the annular lip portion 40 of the cup extends to a lower elevation than the plane of the pan bottom, so that when the pan is placed on the bake oven floor or hearth, the pan bottom will be elevated slightly to permit heat circulation under the pan during the baking period. Circulation of heat through the heat tube constituted of paper cup 28, may be established by puncturing or removing the cup bottom 38, or by cutting away parts thereof according to FIGS. 9 and 14.

From the foregoing explanation it will readily be appreciated that production of the metal foil cake pan, and furnishing it with a paper heat tube as herein proposed, necessarily results in great savings of material and labor costs over the procedure heretofore involved in sheet metal fabrication of the pans, using heavy and expensive machinery. The reduction of expense is so pronounced as to render economically feasible a single use followed by disposition of the pans.

Figure 4:
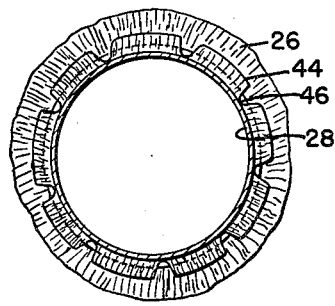
FIG. 4 is a cross-section taken on line 4—4 of FIG. 1.
Figure 5:
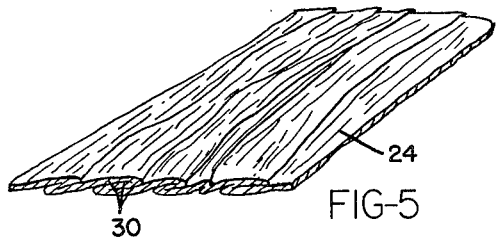
FIG. 5 is an enlarged cross-section taken on line 5—5 of FIG. 1.

FIG. 4 illustrates how the lap or reinforcement 44 of the pan material might be pre-slitted at various locations 46 about the central opening 36 of the pan bottom, in aid of turning the pan material upon itself to establish the reinforcement.

Figure 7:
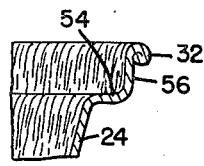
FIG. 7 is a fragmental enlarged cross-section of the rim of the FIG. 6 pan.
Figure 6:
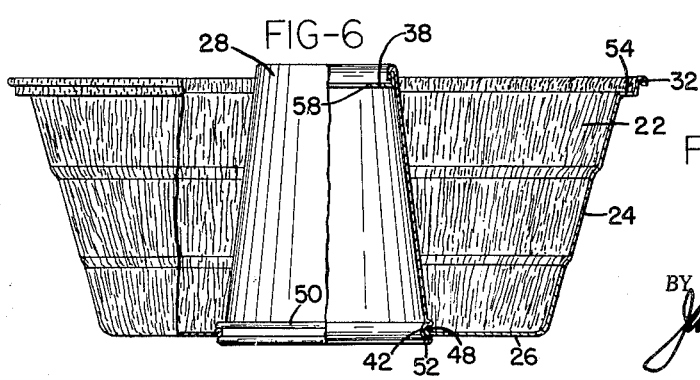
FIG. 6 is a view similar to FIG. 1, showing a modification.
Figure 8:
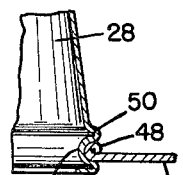
FIG. 8 is a fragmental enlarged cross-section of the connection between the pan and the heat tube of FIG. 6.

FIGS. 6, 7, and 8 suggest a modification of the FIG. 1 pan, wherein a slightly different form of paper cup is utilized as a heat tube, and the center opening 36 of the pan bottom is marginally reinforced by means of a curl or bead 48. The cup of FIGS. 6 and 8 is slightly different from that of FIG. 2, in that it has an annular outwardly projected shoulder 50 intermediate the channel 42 and the tapered side wall of the cup, and its lip portion 52 is turned inwardly rather than outwardly. Procedure for assembly is the same as was above explained.

Noting FIGS. 6 and 7, a modified form of reinforced pan rim is provided, involving an annular shelf 54 and an upstanding beaded flange 56 defining the shelf. Also, the bottom 38 of the inverted cup is apertured at 58 to permit upward circulation of baking heat therethrough, while the pan bottom is held elevated by rim 52, above an oven floor or support tray within the oven.

FIGS. 9 to 12 illustrate a modification of the FIG. 1 assembly, which consists in a departure from the circular shape of the pan bottom opening. It has been determined that the snap action with which the marginal portion of the pan opening seats within the cup channel 60 during assembly, can be augmented and expedited by making the pan opening 62 elliptical or ovaloid in shape, that is, the opening may be elongated so as to have a major axis and a minor axis.

In forming the opening 62 in the pan bottom and reinforcing its margin by means of flange 64, the minor axis of the finished opening may approximate the diametral dimension of channel 60 as its base or seat area. The major axis of the finished opening, on the other hand, is to be greater in length than said diameter of channel 60 and may approximate the distance across the cup at its greatest lip dimension. This is illustrated by FIG. 10, which is a top plan view of FIG. 9.

When as in FIG 11 the cup is advanced upwardly through opening 62 to home position, the flanged margin of the opening snaps readily into channel 60 with a minimum amount of care or attention on the part of the assembler. As FIG. 12 indicates, the cup in home position may tend to assume the oblong shape of the pan bottom opening to some extent, but the distortion is negligible and therefore not objectionable. The character 66 indicates an opening in the paper cup bottom, for heat circulation.

FIG. 13 illustrates a modification of the cake pan, wherein the pan bottom opening is initially made much smaller than the cup diameter, and is then slotted radially to form a series of tabs 68 each to be folded upon itself and bent upwardly and outwardly within the confines of the pan. The tabs perform as spring-like fingers having upper reinforced edges 70 to impinge against the inside surface of the cup in the region of its lip, to firmly connect the cup to the pan bottom. The cup in this instance is one having a simple bead 72 which constricts the cup opening and forms an inside shoulder 74 to abut the tabs. It should readily be evident that cups having formed lips as shown in FIGS. 9, 8, and 2, likewise may be applied to the tab arrangement of the FIG. 13 pan. In this assembly, however, the cup is not to be passed through the bottom opening of the pan, but instead, is applied over and about the ring of tabs through the top opening of the pan.

FIG. 14 illustrates how the assembled pans with heat tubes attached may be nested and stacked for convenience of use at the bakery. This view shows also the formation of radial detents 76 produced by slitting and bending the cup bottoms to form stops which limit the extent of nesting of the pans and cups, so the pans may be easily removed individually from the stack.

FIG. 15 indicates a pan bottom 26 with its central opening 78 reinforced marginally with the use of a narrow strip 80 of foil or the like bent both over and under the pan bottom, to provide a finished and durable opening. The structure here disclosed may be employed in the assemblies of FIGS. 11, 8, and 2.

Figure 16:
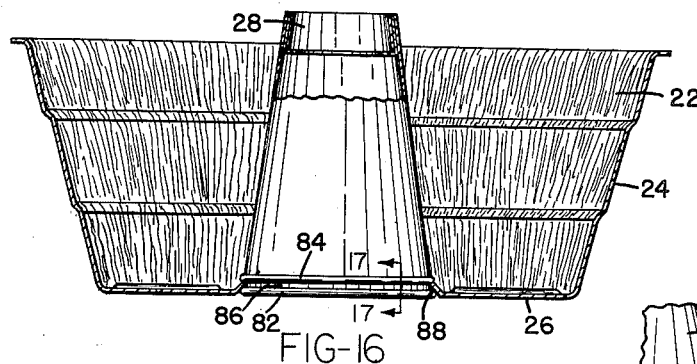
FIG. 16 is a cross-section of a fourth modification of the cake pan, partly in elevation.
Figure 17:
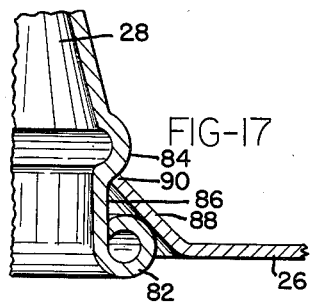
FIG. 17 is an enlarged cross-section on line 17—17 of FIG. 16.

FIGS. 16 and 17 illustrate a modification in which the paper cup lip has an annular exterior bead 82, and an exterior annular shoulder 84 spaced therefrom to provide an annular channel 86 between the bead and the shoulder. The pan bottom 26 in this instance is provided with an inwardly and upwardly directed annular flange 88 inclined relative to the pan bottom, and presenting an annular free locking edge 90 elevated relative to the plane of the pan bottom.

As the paper cup is projected upwardly through the opening of the pan bottom, the shoulder 84 will eventually strike and pass the locking edge 90, causing said edge to spring inwardly toward channel 86, to the position of FIG. 17 at which the locking edge 90 impinges against shoulder 84 where said shoulder meets the channel. At the same time, the inclined portion 88 of the locking flange may bear against bead 82, to arrest further advancement of the cup through the pan bottom opening. Thus, the bead 82 prevents disassociation of the cup from the pan bottom in the upward direction, while the locking flange edge 90 prevents downward dislocation of the cup.

Figure 18:
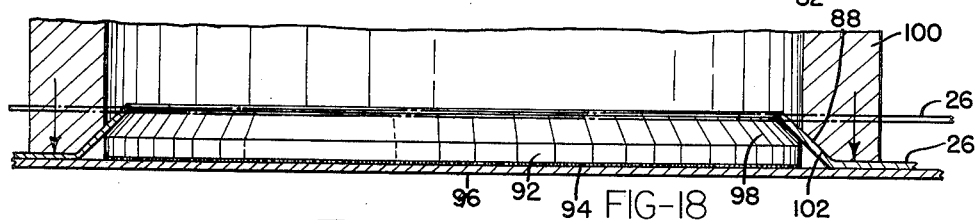
FIG. 18 is a fragmental cross-section of a die set for shaping a pan bottom lock flange.

FIG. 18 shows a die set for forming the annular locking flange 88 of FIGS. 16 and 17. The die set may comprise a circular block 92 with an adhesive layer 94 cementing the block to a table or support 96, which block has a chamfer 98 corresponding to the desired inclination of lock flange 88.

The flat pan bottom 26, previously apertured centrally thereof, is placed atop and centered upon the block as indicated by broken lines in FIG. 18, whereupon the mating cylindrical die part 100 is caused to descend upon the flat pan bottom and force it downwardly onto table 96, while forming the inclined flange 88 against the chamfer 98 of the block. The die 100, of course, has an inclined annular face 102 corresponding to the chamfer of block 92, for forming the flange. In this way, flat centrally apertured pan bottoms may be quickly and easily treated to produce locking flanges such as 88, for accommodating the paper cup heat tubes.

Figure 20:
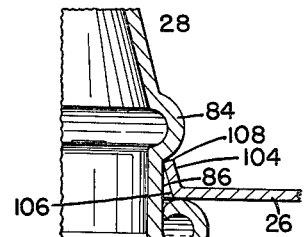
FIG. 20 is a fragmental enlarged cross-section of the connection between the pan body and the heat tube of FIG. 19.

In the FIG. 20 modification, the cup is of the FIG. 17 type and includes the elements 82, 84 and 86. Here the locking flange 104 of the pan bottom is foreshortened and angled more steeply than flange 88, so that the heel 106 of the flange rests within channel 86 and atop the bead 82, while the locking edge 108 impinges against shoulder 84 within the confines of channel 86. This construction is highly effective to preclude displacement of the paper cup in either the upward or downward direction once it has been seated within the pan bottom opening by upward advancement through the opening as suggested by FIGS. 9 and 11.

It may be noted that the width of locking flange 104 approximates the width of the space or channel between the terminal bead 82 and the outwardly projected shoulder 84. Flange 104 preferably is continuous all about the pan bottom opening, and said opening is of slightly lesser diameter than the diameter of the cup at the bead 82 and shoulder 84. As was previously explained herein, the foil material of the pan is found to yield and temporarily distort as the paper cup is advanced to seating position through the opening in the bottom of the pan.

Figure 19:
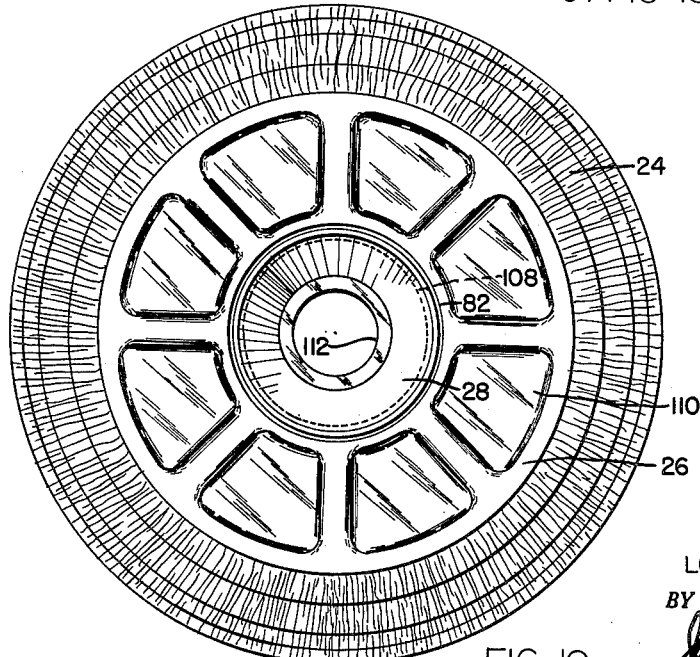
FIG. 19 is a bottom view of a fifth modification of the cake pan completely assembled as in FIG. 20.

FIG. 19 is a bottom plan view incorporating the structure of FIG. 20, and illustrates the completed assembled bake pan. Depressions 110 formed in the pan bottom serve to impart rigidity thereto. The heat tube 28 of paper cup formation is shown with a central opening 112 in the cup bottom, for purposes of oven heat circulation and uniformity of baking. As in all the other herein-described forms of the device, the pans of FIGS. 16 to 20 are of inexpensive metallic foil construction, and their heat tubes are formed of commercially available inexpensive paper drinking cups. The pans once used, therefore, may be thrown away or otherwise disposed of, with economic advantages resulting as previously explained.

It is to be understood that various modifications and changes may be made in the structural details of the herein disclosed pans, within the scope of the appended claims, without departing from the spirit of the invention.

What is claimed is:

1. A throw-away metal foil pan comprising a bottom and an upwardly extending side wall and a preformed separate heat tube having a peripheral bead of known outside diameter bordering one end and having a height in the longitudinal direction of the tube and further having a second encircling bead of known outside diameter spaced from and lying parallel with said peripheral bead, said pan bottom having a central opening and being flexible and deformable at least around said opening, said opening having a diameter less than the said known outside diameter of said peripheral bead and of said second bead, the outside diameter of said tube in the space between said beads being less than the diameter of said opening, said pan bottom having a portion thereof deformed around and defining said opening and lying in the said space between said beads and engaging the spaced beads on adjacent surfaces thereof whereby the said one end of the tube is secured in the opening and to the pan bottom, said deformed portion comprising an upturned flange having an edge directed toward the underside of the second bead.

2. The invention as defined by claim 1, wherein the lowermost edge portion of said peripheral bead lies in a plane below the plane of the underside of the pan bottom, whereby said peripheral bead rests on a supporting surface for and underlying the pan and supports the pan with the bottom of the pan spaced from the underlying supporting surface.

3. The invention as defined by claim 1, wherein said heat tube comprises a tapered cup-like body adapted for insertion tapered end first into said opening whereby upon said insertion said second bead deflects and passes said flange for seating said flange in said space between said beads.

4. The invention as defined by claim 1, wherein said heat tube comprises an inverted, tapered paper cup body adapted for insertion tapered end first into said opening whereby upon said insertion said second bead deflects and passes said flange for seating said flange in said space between said beads.

References Cited by the Examiner

UNITED STATES PATENTS

| | | | |
|---|---|---|---|
| 1,294,528 | 2/19 | Olsen | 126—376 X |
| 1,355,201 | 10/20 | Williams. | |
| 1,505,999 | 8/24 | Gereke | 99—438 |
| 1,713,577 | 5/29 | Wentorf | 99—439 X |
| 2,006,392 | 7/35 | Greider et al. | 99—438 X |
| 2,050,942 | 8/36 | Francis | 285—202 X |
| 2,174,425 | 9/39 | Schlumbohm | 126—9 |
| 2,407,118 | 9/46 | Waters | 229—3.5 |
| 2,811,152 | 10/57 | Wicks | 229—3.5 X |
| 2,960,218 | 11/60 | Cheeley | 99—439 X |
| 3,033,101 | 5/62 | Meyers | 229—3.5 |

FOREIGN PATENTS

| | | |
|---|---|---|
| 968,693 | 5/50 | France. |
| 11,888 | 1884 | Great Britain. |
| 125,749 | 4/19 | Great Britain. |

ROBERT E. PULFREY, *Primary Examiner.*

G. L. MATTESON, Jr., P. R. PATRICK, JEROME SCHNALL, *Examiners.*